United States Patent
Zalich et al.

(10) Patent No.: US 8,742,012 B2
(45) Date of Patent: Jun. 3, 2014

(54) THERMOSETTING FILM-FORMING COMPOSITIONS THAT PRODUCE ATRANE-CONTAINING CURED COATINGS

(75) Inventors: Michael Zalich, Pittsburgh, PA (US); Susan Donaldson, Allison Park, PA (US); Gregory J. McCollum, Gibsonia, PA (US); Randy E. Daughenbaugh, Monroeville, PA (US); Kurt G. Olson, Gibsonia, PA (US); Nathan J. Silvernail, Allison Park, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 253 days.

(21) Appl. No.: 13/277,601

(22) Filed: Oct. 20, 2011

(65) Prior Publication Data
US 2012/0101189 A1 Apr. 26, 2012

Related U.S. Application Data

(60) Provisional application No. 61/405,389, filed on Oct. 21, 2010.

(51) Int. Cl.
*C08L 83/00* (2006.01)
*C09D 143/04* (2006.01)
*C09D 163/00* (2006.01)
*C09D 7/12* (2006.01)

(52) U.S. Cl.
USPC ........... 524/838; 524/588; 528/395; 528/422; 556/170

(58) Field of Classification Search
USPC .............................. 524/838; 528/395; 556/170
See application file for complete search history.

(56) References Cited

U.S. PATENT DOCUMENTS

| | | | |
|---|---|---|---|
| 3,560,546 A * | 2/1971 | Frye, Cecil L. | 556/408 |
| 4,274,989 A * | 6/1981 | Tominaga et al. | 523/415 |
| 4,681,811 A | 7/1987 | Simpson et al. | |
| 5,283,124 A * | 2/1994 | Fujibayashi et al. | 523/404 |
| 5,288,315 A * | 2/1994 | Braig et al. | 106/14.15 |
| 5,483,012 A | 1/1996 | Midogohchi et al. | |
| 5,948,229 A * | 9/1999 | Zwack et al. | 204/502 |
| 6,344,520 B1 | 2/2002 | Greene | |
| 6,858,311 B2 * | 2/2005 | Sumita et al. | 428/447 |
| 7,455,912 B2 * | 11/2008 | Walters et al. | 428/447 |
| 2007/0100110 A1 * | 5/2007 | Scheim et al. | 528/38 |
| 2008/0075870 A1 * | 3/2008 | Ambrose et al. | 427/387 |

FOREIGN PATENT DOCUMENTS

JP 2002097273 A * 4/2002 ........... C08G 77/388
WO WO 2006003032 A1 * 1/2006

OTHER PUBLICATIONS

Machine translation of JP 2002097273.*
C.L. Frye et al., "Pentacoordinate Silicon Compounds V. Novel Silatrane Chemistry," J. Am. Chem. Soc. 93:25, pp. 6805-6811 (1971).*

* cited by examiner

*Primary Examiner* — Vasu Jagannathan
*Assistant Examiner* — Kregg Brooks
(74) *Attorney, Agent, or Firm* — Julie W Meder

(57) ABSTRACT

The invention includes a thermosetting film-forming composition comprising a polytrialkanolamine reacted with a crosslinking agent composition. The composition forms a three-dimensional crosslinked network having atrane-containing linkages.

22 Claims, No Drawings

THERMOSETTING FILM-FORMING COMPOSITIONS THAT PRODUCE ATRANE-CONTAINING CURED COATINGS

CROSS REFERENCE TO RELATED APPLICATION

The present application claims priority to U.S. Provisional Patent Application No. 61/405,389 filed on Oct. 21, 2010 entitled "Thermosetting Film-Forming Compositions that Produce Atrane-Containing Cured Coatings", the entire disclosure of which is herein incorporated by reference.

FIELD OF THE INVENTION

The present invention relates to thermosetting film-forming compositions, in particular, coating compositions containing silatrane linkages.

BACKGROUND OF THE INVENTION

Thermosetting film-forming coating compositions are often cured at elevated temperatures, such as at 350° F. Curable thermosetting coating compositions are widely used in the coatings industries, such as in the automotive and the industrial coatings industries. Such coating compositions desirably have sufficient durability to maintain their appearance and provide protection during the lifetime of a coated article. Thermosetting compositions may be based on epoxy, polyester, or acrylic materials that are then crosslinked to render compositions thermosetting. Such crosslinkers or curing agents include materials such as amines and hydrides, melamines, and blocked or non-blocked isocyanates. These crosslinking agents may be toxic or otherwise detrimental to use. As such, alternative crosslinking materials may be beneficial.

SUMMARY OF THE INVENTION

Such crosslinkages that avoid the use of isocyanates or the like as crosslinking agents are achieved using the coating compositions of the present invention.

The present invention includes a thermosetting film-forming composition including a polytrialkanolamine and a crosslinking agent composition. Upon reaction of the crosslinking agent composition with the polytrialkanolamine, a three-dimensional crosslinked network forms that includes atrane-containing linkages.

The present invention further includes a method of providing a cured coating on a substrate that includes depositing onto the substrate a coating composition comprising a polytrialkanolamine and a crosslinking agent composition, and reacting the trialkanolamine with the crosslinking agent composition, thereby forming a cured coating comprising a three-dimensional crosslinked network comprising atrane-containing linkages.

DETAILED DESCRIPTION OF THE INVENTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of the term "or" means "and/or" unless specifically stated otherwise, even though "and/or" may be explicitly used in certain instances.

The term "polymer" is meant to include homopolymer, copolymer, and oligomer. The term "metal" includes metals, metal oxides, and metalloids.

The present invention relates to thermosetting film-forming compositions. As used herein, the term "film-forming" refers to compositions that include a resin that can form a self-supporting continuous film on at least a horizontal surface of a substrate upon removal of any diluents or carriers present in the composition or upon curing at ambient or elevated temperatures. As used herein, the term "thermosetting composition" refers to a composition that forms a three-dimensional crosslinked network by covalent bond formation upon reaction of trialkanolamine moieties of the polytrialkanolamine and reactive functional groups of a crosslinking agent composition that are reactive with such trialkanolamine moieties.

In the present invention, this three-dimensional crosslinked network comprises atrane-containing linkages. An atrane-containing linkage refers to a linkage that includes an atrane. An atrane is a tricyclic molecule with three rings (typically five-membered rings) that include a heteroatom (often oxygen) and a transannular dative bond between a nitrogen atom and an "M" atom. Therefore, an "atrane-containing linkage" is a linkage that often includes a core structure that can be depicted as follows:

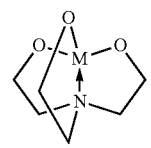

The "M" atom can be, for example, silicon, aluminum, titanium, and/or zirconium.

For purposes of the present invention, the term "atrane" also includes structures in which the transannular dative bond depicted above is stretched (often referred to as quasiatranes) or broken (often referred to as proatranes).

As used herein, the term "polytrialkanolamine" means a compound comprising at least two trialkanolamine moieties per molecule. As used herein, the term "trialkanolamine moiety" means a moiety having the structure:

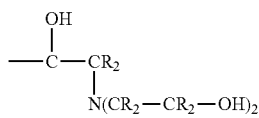

wherein (i) each R is independently hydrogen, an alkyl group, an aryl group, and/or a functional group containing moiety, such as a hydroxyl group, amine group, and/or ether group containing moiety.

Polytrialkanolamines can be made by various methods. For example, polytrialkanolamines may be made by reacting a polyepoxide, such as a diepoxide, with a dialkanolamine, wherein the dialkanolamine is present in an amount sufficient to convert at least two epoxide groups of the polyepoxide to trialkanolamine moieties. Alternatively, ammonia can react with a polyepoxide to form a polymonoalkanolamine followed by oxyalkylation of the remaining N—H groups with a monoepoxide, such as ethylene or propylene oxide.

Polyepoxides suitable for use in such a reaction include, but are not limited to, polyglycidyl esters (such as acrylics from glycidyl methacrylate), polyglycidyl ethers of polyhydric phenols and of aliphatic alcohols, which can be prepared by etherification of the polyhydric phenol, or aliphatic alcohol with an epihalohydrin, such as epichlorohydrin in the presence of alkali. These and other suitable polyepoxides are described in U.S. Pat. No. 4,681,811 at column 5, lines 33-58, incorporated herein by reference.

As used herein, the term "polyepoxide" refers to an epoxy resin having at least two epoxide groups per molecule. In certain embodiments, the epoxy equivalent weight ranges from 100 to 4000 based on solids of the polyepoxide, such as between 100 and 1000. The polyepoxides may be, for example, saturated or unsaturated, and may be, for example, aliphatic, alicyclic, aromatic, or heterocyclic. They may contain substituents such as, for example, halogens, hydroxyl groups, and ether groups. Suitable classes of polyepoxides include epoxy ethers obtained by reacting an epihalohydrin, such as epichlorohydrin, with a polyphenol in the presence of an alkali. Suitable polyphenols include, for example, resorcinol, catechol, hydroquinone, bis(4-hydroxyphenyl)-2,2-propane (Bisphenol A), bis(4-hydroxyphenyl)-1,1-isobutane, bis(4-hydroxyphenyl)-1,1-ethane, bis(2-hydroxyphenyl)-methane, 4,4-dihydroxybenzophenone, and 1,5-dihydroxynaphthalene. In one embodiment, the polyphenol is the diglycidyl ether of Bisphenol A.

Other suitable polyepoxides include polyglycidyl ethers of polyhydric alcohols and/or polyhydric silicones. Suitable polyhydric alcohols include, without limitation, ethylene glycol, propylene glycol, butylene glycol, 1,6-hexylene glycol, neopentyl glycol, diethylene glycol, glycerol, trimethylol propane, and pentaerythritol. These compounds may also be derived from polymeric polyols, such as polypropylene glycol.

Examples of other suitable polyepoxides include polyglycidyl esters of polycarboxylic acids. These compounds may be formed by reacting epichlorohydrin or another epoxy material with an aliphatic or aromatic polycarboxylic acid, such as succinic acid, adipic acid, azelaic acid, sebacic acid, maleic acid, 2,6-naphthalene dicarboxylic acid, fumaric acid, phthalic acid, tetrahydrophthalic acid, hexahydrophthalic acid, or trimellitic acid. Dimerized unsaturated fatty acids containing about 36 carbon atoms (dimer acids) and polymeric polycarboxylic acids, such as carboxyl terminated acrylonitrile-butadiene rubber, may also be used in the formation of these polyglycidyl esters of polycarboxylic acids.

Polyepoxides derived from the epoxidation of an olefinically unsaturated alicyclic compound are also suitable for use in the coating compositions of the present invention. These polyepoxides are nonphenolic and are obtained by epoxidation of alicyclic olefins with, for example, oxygen, perbenzoic acid, acid-aldehyde monoperacetate, or peracetic acid. Such polyepoxides include the epoxy alicyclic ethers and esters well known in the art. Other suitable polyepoxides include epoxy novolac resins. These resins are obtained by reacting an epihalohydrin with the condensation product of aldehyde and monohydric or polyhydric phenols. A typical example is the reaction product of epichlorohydrin with a phenol-formaldehyde condensate.

Suitable polyepoxides also include epoxy-functional organopolysiloxanes, such as the resins described in U.S. Pat. No. 6,344,520 at column 3, line 46 to column 6, line 41, the cited portion of which is incorporated herein by reference.

Suitable dialkanolamines include N,N-dialkylalkanolamines and N-alkyl dialkanolamines, such as those disclosed in U.S. Pat. No. 5,483,012 at column 3, lines 49-63, the cited portion of which is incorporated herein by reference.

In some embodiments, the polytrialkanolamine is a polymer that is the reaction product of reactants comprising: (a) a polymeric polyepoxide, such as any of those described above; and (b) a dialkanolamine, such as any of those described above.

In some embodiments, the crosslinking agent composition comprises a polytrialkoxide. As used herein, the term "polytrialkoxide" refers to a compound comprising at least two -M(OR')$_3$ moieties, wherein (i) M is as defined above, and (ii) each R' is independently a hydroxyl group or an alkyl group.

Such polytrialkoxides can be monomeric or polymeric. Exemplary polytrialkoxides, include, without limitation, ditrialkoxides, such as those having the following chemical structure: (XO)$_3$-M-Q-M-(OX)$_3$, wherein (i) X is an alkyl group; (ii) M is as defined above; and (iii) Q is a linking group which may or may not contain repeat units and may be carbon based or silicon based.

Exemplary polymeric polytrialkoxides include those comprising pendant and/or terminal trialkoxide moieties. The backbone of such polymers can be, for example, acrylic, polyurethane, polyester, polyurea, polyether, polysiloxane, polyvinyl, cellulosic, acrylate, co-polymers thereof, and mixtures thereof. Those skilled in the art will appreciate that trialkoxide moieties may be attached to such polymeric backbones by any of a variety of methods.

In one example, such a polymer is an acrylic polymer synthesized from one or more unsaturated polymerizable monomers comprising a silane-containing ethylenically unsaturated polymerizable monomer. One example of such a polymer is disclosed in U.S. Pat. No. 7,455,912 at column 3, line 23 to column 6, line 37, the cited portion of which is incorporated herein by reference.

In another example, such a polymer comprises a Michael addition reaction product of reactants comprising: (a) a compound comprising more than one site of ethylenic unsaturation, and (b) an aminofunctional silane, such as is described in U.S. Patent Application Publication No. 2008/0075870 A1 at [0018] to [0027], the cited portion of which is incorporated herein by reference.

In some embodiments, the crosslinking agent composition comprises a tetraalkoxide of the general formula M(OR')$_4$, wherein (i) M is as defined above, and (ii) R' is as defined above; and a compound comprising two or more active hydrogen groups, such as a polyol, polyamine, and/or a polythiol.

In some embodiments, the crosslinking agent composition comprises: (a) an alkoxy-functional and/or hydroxy-functional atrane of the general formula:

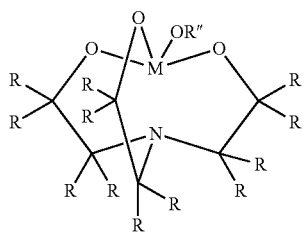

wherein (i) M is as defined above; (ii) each R is as defined above; and (iii) R" is hydrogen or an alkyl group; and (b) a compound comprising two or more active hydrogen groups, such as a polyol, polyamine, and/or a polythiol.

In some embodiments, the thermosetting compositions of the present invention further comprise a catalyst for catalyzing the reaction between the polytrialkanolamine and the crosslinking agent composition. Suitable catalysts include organometallic compounds or metal alkoxide compounds, e.g., organotin compounds, such as dibutyl tin dilaurate, dibutyl tin dioctoate and dibutyl tin diacetate, titanium compounds, such as titanium n-butoxide and titanium isopropoxide, and zirconium compounds, such as zirconium n-butoxide. Other suitable catalysts include quaternary ammonium compounds including, but not limited to, pyridine, piperidine, dimethylaniline, diethylenetriamine, tetramethylammonium chloride, tetramethylammonium acetate, tetramethylbenzylammonium acetate, tetramethylammonium fluoride, tetraethylammonium fluoride, tetrabutylammonium fluoride, and tetrabutylammonium bromide. The use of such catalysts can provide for efficient curing of the thermosetting composition at relatively low temperatures, such as 180° F. to 250° F.

As will be appreciated from the foregoing, the present invention is also directed to methods of providing a cured coating on a substrate. The methods comprise: (a) depositing onto the substrate a coating composition comprising: (i) a polytrialkanolamine; and (ii) a crosslinking agent composition; and (b) causing the trialkanolamine to react with the crosslinking agent composition, thereby providing a cured coating comprising a three-dimensional polymeric network comprising atrane-containing linkages.

The following examples are presented to demonstrate the general principles of the invention. The invention should not be considered as limited to the specific examples presented. In particular, the following examples describe production of atranes (and coating compositions containing the same) based on silicon. Other atranes and coating compositions based on other metals (such as phosphorus, aluminum, titanium, zirconium, iron, vanadium, and/or bismuth) may be produced with similar techniques. All parts are by weight unless otherwise indicated.

EXAMPLES

Example 1

Coating Composition Crosslinked Via Silatrane Linkages

Part A: Preparation of Polytrialkanolamine Component

280 Grams of Eponex 1510 (available from Hexion Specialty Chemicals, Columbus, Ohio) was added to a 2 L round bottom flask and heated to 175° F. under a nitrogen blanket. Diisopropanolamine (173.47 g) was slowly added to the flask and an exotherm occurred. The temperature of the mixture was controlled so that it did not go above 265° F. and while all of the diisopropanolamine was added. The final amine equivalent weight was 348.3 g·eq$^{-1}$ and the number average molecular weight was 758 g·mol$^{-1}$.

Part B: Preparation of Polytrialkoxysilane Component 2877.60 Grams of ethanol was added to a 12 L round bottom flask, equipped with a condenser, a thermocouple with a nitrogen inlet and a mechanical stirrer, and heated to reflux. After the reflux temperature of ethanol was reached, two mixtures were added simultaneously over a three-hour period. The first mixture included 1243.7 g ethanol, 69.48 g acrylic acid, 810.9 g A-174 (available from Momentive Performance Materials, Inc., Wilton, Conn.), 275.6 g methyl methacrylate, 1.16 g butyl acrylate and 1.16 g hydroxyethyl methacrylate. The second mixture included 49.2 g Vazo 67 (available from DuPont Chemical Company) and 613.2 g ethanol. After the addition of the first and second mixtures, the reaction was held at reflux for two hours. After the two-hour hold at reflux, a third mixture (12.27 g Vazo 67 mixed with 73.7 g ethanol) was added over a 30-minute time period. The reaction was held at reflux for two hours after the addition of the third mixture. After the two-hour hold period, the reaction was cooled to room temperature.

Part C: Preparation of Coating Composition

The polytrialkanolamine component of Part A (4.1 g) was mixed with 0.139 g Tyzor TPT (available from DuPont Chemical Company). The polytrialkoxysilane component of Part B (10 g) was added to the mixture of trialkanolamine component and Tyzor TPT and the mixture was stirred using a magnetic stir bar on a magnetic stir plate. This composition was applied to two cold-rolled steel substrates and two glass substrates using a draw down bar. One coated cold-rolled steel substrate and one coated glass substrate were baked for 30 minutes at 250° F., while the remaining two substrates were baked for 30 minutes at 300° F. The coated cold-rolled steel substrates were evaluated by conducting solvent rubs and the coatings on the glass substrates were used for solid state $^{29}$Si-NMR analyses.

Acetone double rubs were performed according to ASTM D 5402. The coating baked for 30 minutes at 250° F. had less than 100 acetone double rubs, while the coating baked for 30 minutes at 300° F. had greater than 100 acetone double rubs. Coatings prepared on glass were removed with a razor blade and analyzed with a Bruker DRX NMR spectrometer. The spectra were externally referenced to kaolinite at −91.4 ppm. The presence of resonances at −70 ppm indicates the formation of silatrane species.

Example 2

Coating Composition with Crosslinked Via Silatrane Linkages

Part A: Preparation of Polytrialkanolamine Component

First, an epoxy containing acrylic copolymer was synthesized as follows, using the following components:

TABLE 1

| Ingredients | Parts by weight |
|---|---|
| Charge #1 | |
| Amyl propionate | 374.9 |
| Dowanol DPM | 93.7 |
| Charge #2 | |
| Glycidyl methacrylate | 776.2 |
| Butyl methacrylate | 492.8 |
| Alpha methyl styrene | 25.9 |
| Charge #3 | |
| Amyl propionate | 74.6 |
| Dowanol DPM | 18.7 |
| Di-t-amyl peroxide | 104 |
| Charge #4 | |
| Amyl propionate | 4 |
| Dowanol DPM | 1 |
| Charge #5 | |
| Glycidyl methacrylate | 183.8 |
| Methyl methacrylate | 3.2 |
| Styrene | 112 |
| Alpha methyl styrene | 6.1 |
| Charge #6 | |
| Amyl propionate | 4 |
| Dowanol DPM | 1 |
| Charge #7 | |
| Amyl propionate | 4 |
| Dowanol DPM | 1 |
| Charge #8 | |
| Amyl propionate | 91.4 |
| Dowanol DPM | 22.8 |
| t-amyl peroxyacetate | 26.7 |
| Charge #9 | |
| Amyl propionate | 24 |
| Dowanol DPM | 6 |
| Charge #10 | |
| Amyl propionate | 188.56 |
| Dowanol DPM | 47.14 |

Charge #1 was added into a pressure reactor equipped with an impeller and a temperature control device. Charge #2 and #3 were added via feed pumps over a 2.5 and 4 hour period respectively, whereupon after the completion of adding Charge #2, the addition of Charge #5 began for a 0.5 hour period. After the addition of Charge #2 was complete, the vessel that had contained Charge #2 was rinsed with Charge #4 into the reactor. After the addition of Charge #5, the vessel that contained Charge #5 was rinsed with Charge #7 into the reactor. After the addition of Charge #3, the vessel that contained Charge #3 was rinsed with Charge #6 into the reactor and the temperature was decreased to 260° F. Charge #8 was added to the reactor over a 1.5 hour period. After the addition of Charge #8, the vessel that contained Charge #8 was rinsed with Charge #9 into the reactor and the reaction was held at 260° F. for 1 hour. After the reaction was completed, Charge #10 was added to the reactor to adjust the % solids to 64%. The acrylic polymer solution thus obtained had an epoxy equivalent weight between 358 and 368 (measured by titration) and $M_w$ between 2400 and 3000 g·mol$^{-1}$ (measured by gel permeation chromatography using polystyrene standards).

The epoxy containing acrylic copolymer was converted into a polytrialkanolamine as follows. The epoxy containing acrylic copolymer (370 g) was added to a 4 neck, 1 L round bottom flask equipped with a condenser, a mechanical stirrer, a thermocouple/nitrogen inlet and an addition funnel. The stirrer, nitrogen flow, and water for the condenser were turned on and the flask was heated to 175° F. Once the contents of the flask reached 175° F., a dropwise addition of 95 g of diethanolamine began and lasted for 1 hour. After the addition of diethanolamine, the temperature was increased to 230° F. and held for 1 hour. The reaction contents were poured into 400 g Dowanol PM. The final epoxy equivalent weight was 7130.

Part B: Preparation of Polytrialkoxysilane Component

Ethanol (287.8 g) was added to a 1 L round bottom flask, equipped with a condenser, a thermocouple with a nitrogen inlet and a mechanical stirrer, and heated to reflux. After the reflux temperature of ethanol was reached, two mixtures were added simultaneously over a three-hour period. A first mixture included 124.4 g ethanol, 6.9 g acrylic acid, 81.1 g A-174 (available from Momentive Performance Materials, Inc., Wilton, Conn.), 27.6 g methyl methacrylate, and 0.11 g butyl acrylate. A second mixture included 4.9 g Vazo 67 (available from DuPont Chemical Company) and 61.3 g ethanol. After the addition of the first and second mixtures, the reaction was held at reflux for two hours. After the two-hour hold at reflux, a third mixture of 1.2 g Vazo 67 mixed with 7.4 g ethanol was added over a 30-minute time period. The reaction was held at reflux for two hours after the addition of the third mixture. After the two-hour hold period, the reaction was cooled to room temperature.

Part C: Preparation of Coating Composition

The polytrialkanolamine component of Example 2, Part A (4 g) was mixed with 13.8 g of the polytrialkoxysilane component of Example 2, Part B, and the mixture was stirred using a magnetic stir bar on a magnetic stir plate. This composition was applied to cold-rolled steel using a draw down bar. Two coated cold-rolled steel substrates were prepared. One coated cold-rolled steel substrate was baked for 30 minutes at 180° F., while the other cold-rolled steel substrate was baked for 30 minutes at 250° F. In addition, a glass substrate was coated and baked for 30 minutes at 250° F. The coated cold-rolled steel substrates were evaluated by conducting solvent rubs, and the coated glass substrate was used as a source of coating for solid state $^{29}$Si-NMR analysis. Methyl ethyl ketone double rubs were performed as per ASTM D 5402. The coating baked for 30 minutes at 180° F. had 60 methyl ethyl ketone double rubs, while the coating baked for 30 minutes at 250° F. had greater than 200 methyl ethyl ketone double rubs. The coating prepared on glass was removed with a razor blade and analyzed with a Bruker DRX NMR spectrometer. The spectrum was externally referenced to kaolinite at −91.4 ppm. The presence of a resonance at −70 ppm indicates the formation of silatrane species.

While the preferred embodiments of the present invention are described above, obvious modifications and alterations of the present invention may be made without departing from the spirit and scope of the present invention. The scope of the present invention is defined in the appended claims and equivalents thereto.

The invention claimed is:

1. A thermosetting film-forming composition comprising:
(a) a polytrialkanolamine; and
(b) a crosslinking agent composition that, upon reaction with the polytrialkanolamine, forms a three-dimensional crosslinked network comprising atrane-containing linkages between a plurality of polymer backbones.

2. The composition of claim 1, wherein the polytrialkanolamine is a polymer.

3. The composition of claim 2, wherein the polytrialkanolamine is the reaction product of reactants comprising:
(a) a polymeric polyepoxide; and
(b) a dialkanolamine.

4. The composition of claim 1, wherein the crosslinking agent composition comprises silicon and, upon reaction with the polytrialkanolamine, forms a three-dimensional polymeric network comprising silatrane-containing linkages.

5. The composition of claim 1, wherein the crosslinking agent composition comprises a polytrialkoxide comprising at least two moieties of the general formula:

-M(OR')$_3$, wherein:

(i) M is silicon, aluminum, titanium, and/or zirconium; and
(ii) each R' is independently a hydroxyl group or an alkyl group.

6. The composition of claim 5, wherein each M is silicon.

7. The composition of claim 5, wherein the polytrialkoxide comprises a polymer.

8. The composition of claim 7, wherein the polymer comprises an acrylic polymer synthesized from one or more unsaturated polymerizable monomers comprising a silane-containing ethylenically unsaturated polymerizable monomer.

9. The composition of claim 5, wherein the crosslinking agent composition comprises a Michael addition reaction product of reactants comprising: (a) a compound comprising more than one site of ethylenic unsaturation, and (b) an aminofunctional silane.

10. The composition of claim 1, wherein the crosslinking agent composition comprises:
(a) a tetraalkoxide of the general formula M(OR')$_4$, wherein (i) M is silicon, aluminum, titanium, and/or zirconium, and (ii) each R' is independently a hydroxyl group or an alkyl group; and
(b) a compound comprising two or more active hydrogen groups.

11. The composition of claim 1, wherein the crosslinking agent composition comprises:
(a) an alkoxy-functional and/or hydroxy-functional atrane of the general formula:

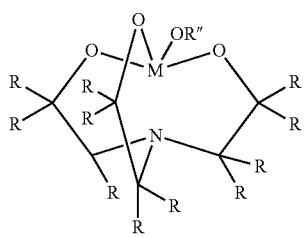

wherein (i) M is silicon, aluminum, titanium, and/or zirconium; (ii) each R is independently hydrogen, an alkyl group, an aryl group, and/or a functional group containing moiety, such as a hydroxyl group, amine group, and/or ether group containing moiety; and (iii) R" is hydrogen or an alkyl group; and
(b) a compound comprising two or more active hydrogen groups.

12. A method of providing a cured coating on a substrate comprising:
(a) depositing onto the substrate a coating composition comprising:
(i) a polytrialkanolamine; and
(ii) a crosslinking agent composition; and
(b) reacting the trialkanolamine with the crosslinking agent composition, thereby forming a cured coating comprising a three-dimensional polymeric network comprising atrane-containing linkages between a plurality of polymer backbones.

13. The method of claim 12, wherein the polytrialkanolamine is a polymer.

14. The method of claim 13, wherein the polytrialkanolamine is the reaction product of reactants comprising:
(a) a polymeric polyepoxide; and
(b) a dialkanolamine.

15. The method of claim 12, wherein the crosslinking agent composition comprises silicon.

16. The method of claim 12, wherein the crosslinking agent composition comprises a polytrialkoxide comprising at least two moieties of the general formula:

-M(OR')$_3$, wherein:

(i) M is silicon, aluminum, titanium, and/or zirconium; and
(ii) each R' is independently a hydroxyl group or an alkyl group.

17. The method of claim 16, wherein each M is silicon.

18. The method of claim 16, wherein the polytrialkoxide comprises a polymer.

19. The method of claim 18, wherein the polymer comprises an acrylic polymer synthesized from one or more unsaturated polymerizable monomers comprising a silane-containing ethylenically unsaturated polymerizable monomer.

20. The method of claim 16, wherein the crosslinking agent composition comprises a Michael addition reaction product of reactants comprising: (a) a compound comprising more than one site of ethylenic unsaturation, and (b) an aminofunctional silane.

21. The method of claim 12, wherein the crosslinking agent composition comprises:
(a) a tetraalkoxide of the general formula M(OR')$_4$, wherein (i) M is silicon, aluminum, titanium, and/or zirconium, and (ii) each R' is independently a hydroxyl group or an alkyl group; and
(b) a compound comprising two or more active hydrogen groups.

22. The method of claim 12, wherein the crosslinking agent composition comprises:
(a) an alkoxy-functional and/or hydroxy-functional atrane of the general formula:

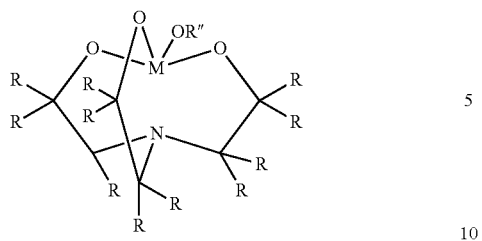
wherein (i) M is silicon, aluminum, titanium, and/or zirconium; (ii) each R is independently hydrogen, an alkyl group, an aryl group, and/or a functional group containing moiety, and (iii) R" is hydrogen or an alkyl group; and
(b) a compound comprising two or more active hydrogen groups.
* * * * *